United States Patent [19]

Allingham et al.

[11] 4,179,547
[45] Dec. 18, 1979

[54] POLYETHYLENE SHEETS AND FILMS

[75] Inventors: Yael Allingham; David Vofsi; Saul A. Gassner, all of Rehovot, Israel

[73] Assignee: Yeda Research and Development Co. Ltd., Rehovot, Israel

[21] Appl. No.: 915,433

[22] Filed: Jun. 14, 1978

[30] Foreign Application Priority Data

Jun. 29, 1977 [IL] Israel ............................. 52412

[51] Int. Cl.$^2$ .............................................. C08K 3/32
[52] U.S. Cl. .......................... 525/2; 260/29.6 MP; 260/45.7 P; 260/42.45
[58] Field of Search ............... 526/2; 260/29.6 MP, 260/45.7 P, 42.45

[56] References Cited

U.S. PATENT DOCUMENTS

| | | | |
|---|---|---|---|
| 3,386,948 | 6/1968 | Needham et al. | 260/42.45 |
| 3,437,626 | 4/1969 | Glabisch | 260/29.6 MP |
| 3,607,828 | 9/1971 | Husseg | 260/42.45 |

FOREIGN PATENT DOCUMENTS 479260  5/1968  Japan ............................. 526/2

Primary Examiner—William E. Schulz
Attorney, Agent, or Firm—Ladas, Parry, Von Gehr, Goldsmith & Deschamps

[57] ABSTRACT

According to the invention there is provided a polymeric composition of matter substantially transparent to solar radiation and constituting an effective barrier to infra-red radiation, especially in the region of about $7\mu$ to $15\mu$, comprising polyethylene or a copolymer of mainly polyethylene, containing an effective quantity of a phosphate, having a preferred range of content of phosphate of from 1 to 20 percent by weight. There is also provided a tunnel-shaped or similar structure for the cultivation of agricultural crops comprising a cover of sheeting made of such polymer.

6 Claims, 1 Drawing Figure

— · · — IPE 111
········ Infrune X 30
——— IPE 111 + 10% sodium metaphosphate (Maddrell salt).

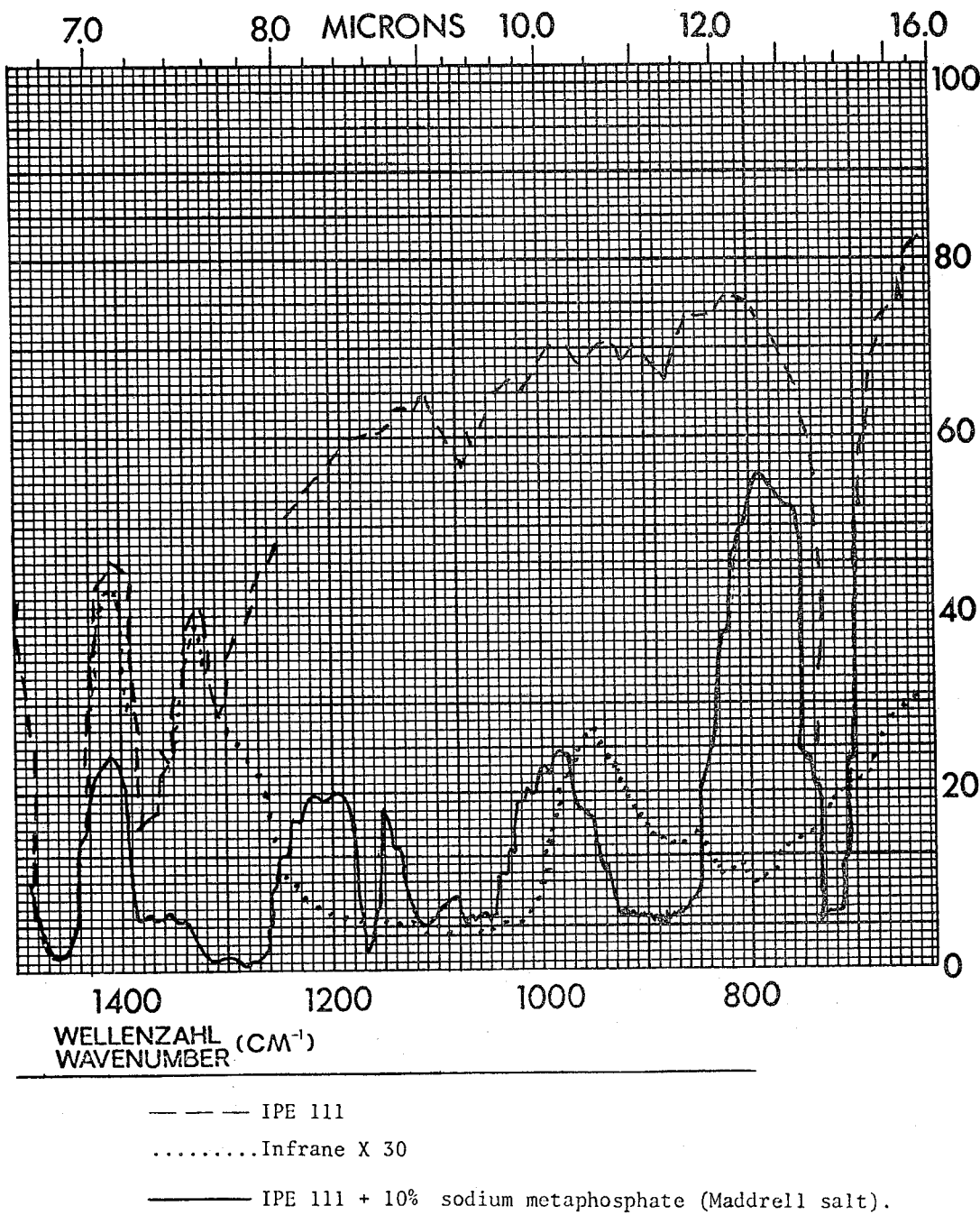
——— IPE 111
········ Infrane X 30
——— IPE 111 + 10% sodium metaphosphate (Maddrell salt).

POLYETHYLENE SHEETS AND FILMS

FIELD OF INVENTION

The invention relates to novel polymeric compositions of matter, for use in agriculture. More specifically it relates to certain novel polymers or copolymers of ethylene adapted to pass substantially unhindered light in the visible range, yet be substantially impervious to a substantial fraction of light in the infra-red range. Such polyethylenes or copolymers of polyethylene in sheet and film form are especially suitable for use as plastic sheets or films covering structures under which winter or spring crops are grown. Preferred thicknesses are about 0.15 to 0.5 mm. Other and further aspects of the invention will become apparent hereinafter.

The use of polyethylene sheets or films for mulching is an efficient method for heat sterilization of soil. Polyethylene films containing metaphosphate filler enhance the sterilization process by reducing the heat losses from the soil due to serving as infra-red barrier to infra-red radiation, given by the soil.

BACKGROUND OF THE INVENTION

Quite large areas of land devoted to the cultivation of winter crops are covered with tunnel-like structures, low tunnels, walk-in tunnels and greenhouses; using polyethylene sheeting for protection of the crops from the cold. The polymeric substances are chosen in such manner as to permit light in the visible range to penetrate said sheeting. When the visible light penetrates the sheeting and reaches the ground or the growing plant, part of it is converted into light of longer wavelength, in the infra-red range, and generally the temperature inside such tunnels is higher than the outside temperature. At night, when no illumination by sun-light takes place, heat will be lost through the polyethylene sheeting through infra-red radiation passing through said sheeting, as this is generally quite pervious to such radiation. The resulting drop of temperature is harmful to the growth of the plants and hitherto various attempts have been made to provide compositions of matter which will substantially prevent the heat loss due to infra-red radiation.

STATE OF THE PRIOR ART

In French Pat. No. 1,574,088 there are described plastic films, which are pervious to solar radiation and constitute a barrier to infra-red radiation, which comprise a polymer of ethylene or a copolymer of ethylene and of vinyl acetate containing at least 10 percent by weight of finely dispersed silica or aluminum hydroxide. Water formed in the process by exudation from the inorganic filter spoils the mechanical properties of such films. There exists a further French Pat. No. 2,213,954 which provides plastic sheeting of polyethylene or copolymers or polyethylene and vinyl acetate containing 1 to 20 percent by weight of anhydrous alumo silicate. The work-up of the compositions of matter according to the latter patent requires the use of esters of polyalcohols or of polyamino alcohols. This process is rather complicated and the resultant product seems to be rather expensive.

The main advantage of the metaphosphate filler as compared to the aluminum silicate is that the sodium metaphosphate filler is substantially transparent to the visible light while the aluminum silicate filler absorbs as much as 50% of the visible light. The visible light is both essential for crops grown under the plastic tunnel and is essential for heating the soil.

SUMMARY OF THE INVENTION

The present invention relates to polymeric compositions of matter, in sheet form, which sheets are substantially pervious to solar radiation, yet constitute an efficient barrier to infra-red radiation, said sheets being characterized in that the matrix is polyethylene or a copolymer in which polyethylene predominates, containing a sufficient quantity of a metaphosphate of a metal chosen from among group 1 to 3 of the periodic table. The film must be pervious to solar radiation, and it is well known that polyethylene polymers or copolymers have this property. The addition of certain phosphates, and especially metaphosphates does not perceptibly impair the transmission of solar radiation, but changes in a very pronounced manner the transmission of infra-red radiation.

The critical region is that of about $7\mu$ to $15\mu$, and it is well known that there exist certain ions which absorb in this region. Thus it is known that $PO_4^{-3}$ absorbs strongly in this region. The spectra of polyanions of the $MPO_3$-type is described in:

a. D. E. C. Corbridge et al., J. Chem. Soc. (1954) 493–504;
b. Infrared Spectra of Inorganic Compounds, R. A. Nyquist, Academic Press, New York, 1971.
c. Bertoluzza et al., Atti della Acedemia Nationale, Lincei Rend. Sc. fis. Mat. e. Nat. Vol. LVI, 1974.

The region of 7 to $15\mu$ corresponds to about 1300 $cm^{-1}$ to 800 $cm^{-1}$. The polyanions $(NaPO_3)_x$, $(KPO_3)_x$, $(CaPO_3)_x$ and $(AlPO_3)_x$ all have strong absorption spectra in the 800 $cm^{-1}$ to 1400 $cm^{-1}$ region and they are substantially transparent in the visible region.

According to the present invention there are provided polymeric blends of polyethylene or of copolymers containing a a preponderant quantity of polyethylene, comprising a quantity of finely dispersed phosphate having a strong absorption in the I.R. region, while being substantially transparent in the visible range. According to a preferred embodiment, the phosphates used are insoluble forms of sodium- potassium- calcium- or aluminum-metaphosphate. The quantity of these incorporated in the polymeric matrix may be varied between 1 and 20 percent by weight, the preferred range being 3 to 10 percent by weight. The preferred polyethylene is low density polyethylene or copolymers of ethylene with vinyl acetate as e.g. a material known on the market as EVA. The insoluble forms of the above metaphosphates can be blended with a granulate of polyethylene by standard industrial processes, such as milling, double screw extrusion or by the use of a mixer of the Banbury type. There is obtained a homogeneous composition of matter which can be blow-extruded in the form of sheets of conventional thickness used for the coverage of crops by means of structures used in agriculture, and such films have the mechanical strength required for such purpose. Experiments have shown that films of low density polyethylene containing from 5 to 10 percent by weight of sodium metaphosphate, or of potassium metaphosphate have good mechanical properties; they are substantially transparent to solar radiation, yet absorb at least 80 percent of infrared radiation in the 7 to 15 $\mu$ region. Films according to the present invention were immersed in water and during 24 hours essentially no leaching took place and physical properties did not deteriorate.

In a similar manner there can be used other phosphates, and especially metaphosphates which have the required optical properties. While the insoluble polymethaphosphates of sodium and potassium have been found particularly suitable for the purpose of this invention, the invention is not limited to these phosphorus containing salts only. Thus, metaphosphates, or polymethaphosphates of aluminum, calcium, barium, etc. may also be suitable.

DESCRIPTION OF THE DRAWING

The FIGURE shows infrared absorbtion spectra in the region between 7 micron and 15 microns.

EXAMPLE

40 Kg of sodium metaphosphate (Maddrell salt) were mixed with 400 Kg of low density polyethylene in a Banbury internal mixer at 170°–180° C. Subsequently the mix from the Banbury mixer was extruded and pelletized in the conventional manner.

The pellets were then fed into an extruder provided with a blowing attachment, whereby a flat tube was formed and rolled up on an uptake mandrel.

From the flat tube, sheets and films of the desired thickness were used for crop covering structures. Good results were obtained with thicknesses from about 0.1 mm to 0.5 mm.

The absorption spectra of a film 0.1 mm thick was compared those of low density polyethylene IPE 111 grade (an ISR. PET. IND. product) and of a commercially available film INFRANE X30, both of 0.1 mm thickness.

In diagram 1 infrared absorption spectra in the region between 7 micron and 15 microns are given.

The spectra show that the film of the invention compares favourably with the commercial film.

However, the commercially available film reduces the transmission of light in the visible region of about 50% as compared to low density polyethylene while the film of the present invention reduces transmission by only 10% of that of polyethylene.

Tensile strength measurement of the film with 10% sodium metaphosphate filler is practically unaltered from that of polyethylene IPE 111.

We claim:

1. A polymeric composition of matter substantially transparent to solar radiation and constituting an effective barrier to infra-red radiation, especially in the region of about 7 $\mu$ to 15 $\mu$, comprising polyethylene or a copolymer of mainly polyethylene, containing an effective quantity of an insoluble metaphosphate.

2. A polymeric composition according to claim 1, wherein the metaphosphate is sodium metaphosphate, potassium metaphosphate, aluminum metaphosphate or calcium metaphosphate.

3. A composition according to claim 1, wherein the content of the metaphosphate is from 1 to 20 percent by weight.

4. A polymer according to claim 1, in sheet or film form.

5. A structure for the cultivation of agricultural crops comprising a cover of sheeting or film made of a polymer according to claim 1.

6. A structure wherein the sheeting or film is of 0.1 to 0.5 mm thickness according to claim 5.

* * * * *